Figure 1:
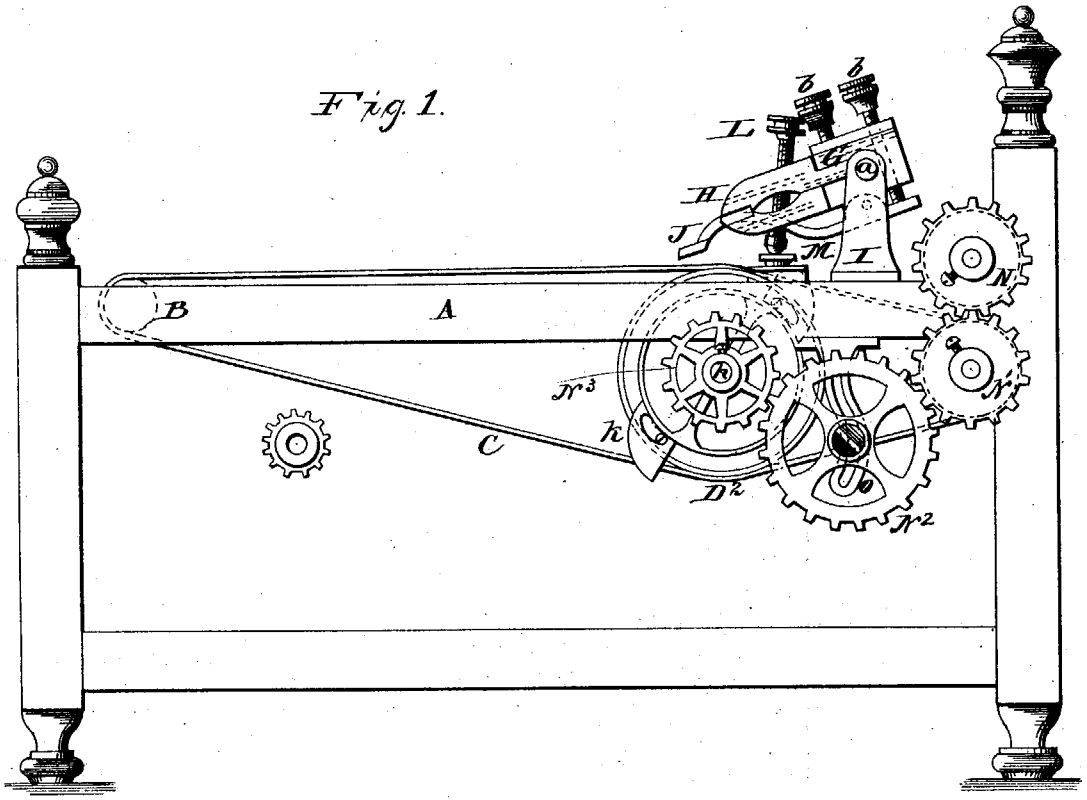

3 Sheets—Sheet 1.

W. O. HICKOK & A. COOPER,

Said COOPER assignor to said HICKOK.

Paper-Ruling Machine.

No. 8,667. Reissued April 8, 1879.

WITNESSES
H. A. Toulmin
J. J. McCarthy,

By

INVENTOR
Wm O. Hickok
Albert Cooper
Alexander Thacher
ATTORNEYS

N. PETERS, PHOTO-LITHOGRAPHER, WASHINGTON, D. C.

W. O. HICKOK & A. COOPER,
Said COOPER assignor to said HICKOK.
Paper-Ruling Machine.
No. 8,667. Reissued April 8, 1879.
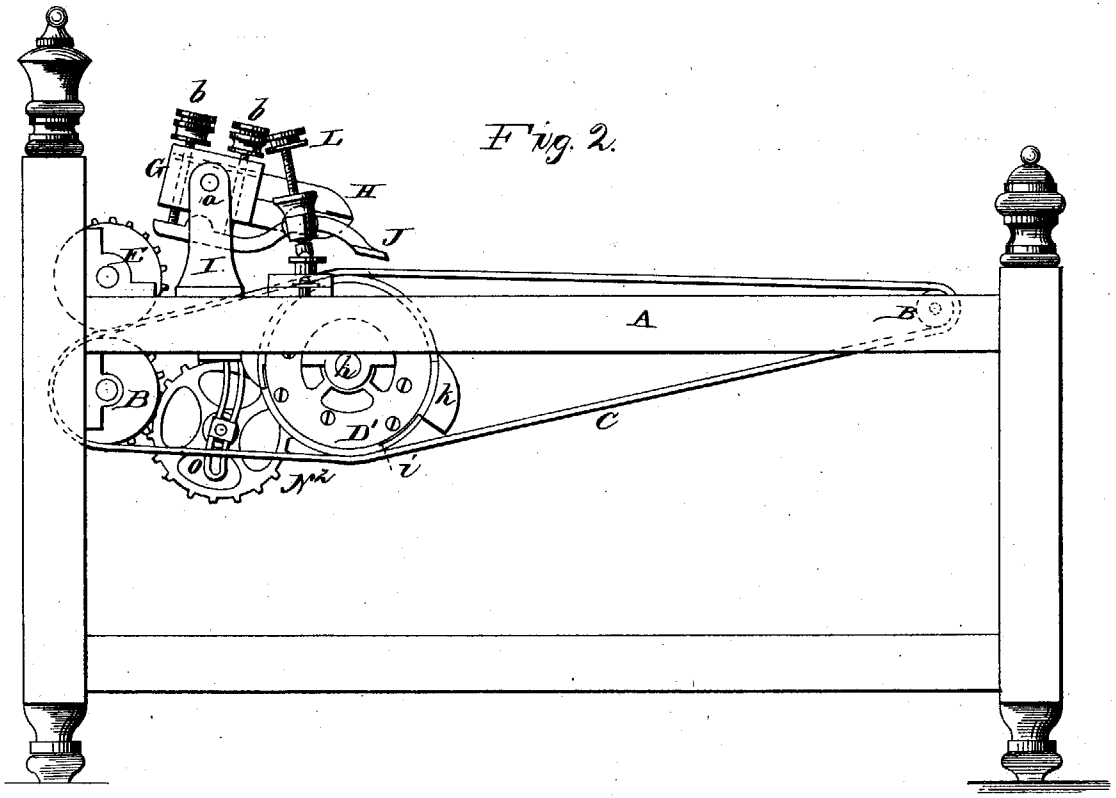
WITNESSES
H. A. Toulmin
J. J. McCarthy.
By
INVENTOR
Wm O. Hickok
Albert Cooper
Alexander Mason
ATTORNEYS
N. PETERS, PHOTO-LITHOGRAPHER, WASHINGTON, D. C.

W. O. HICKOK & A. COOPER,
Said COOPER assignor to said HICKOK.
Paper-Ruling Machine.
No. 8,667. Reissued April 8, 1879.
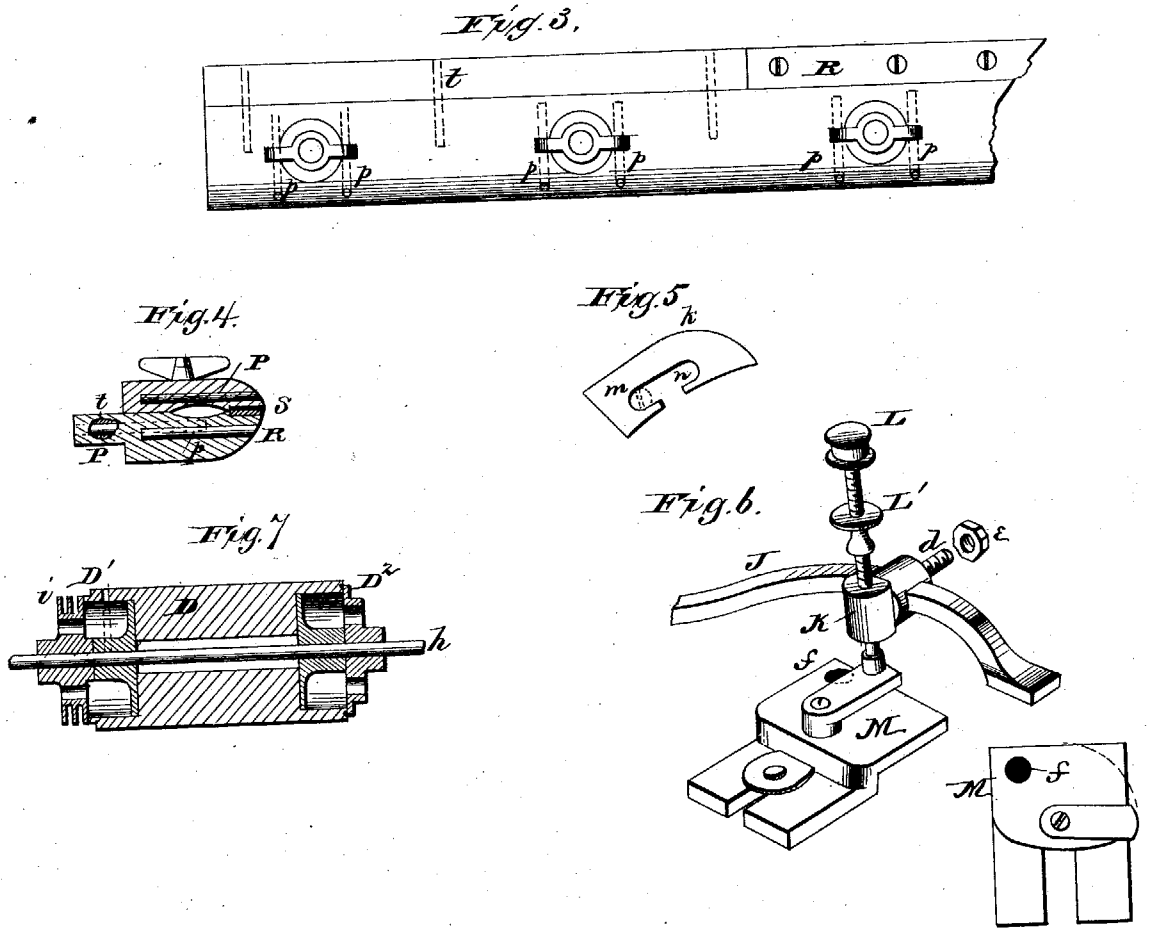
WITNESSES
F. L. Ouraud
J. J. McCarthy.
By
INVENTOR
Wm O. Hickok
Albert Cooper
Alexander Mason
ATTORNEYS
N. PETERS, PHOTO-LITHOGRAPHER, WASHINGTON, D. C.

UNITED STATES PATENT OFFICE.

WILLIAM O. HICKOK AND ALBERT COOPER, OF HARRISBURG, PENNSYLVANIA; SAID COOPER ASSIGNOR TO SAID HICKOK.

IMPROVEMENT IN PAPER-RULING MACHINES.

Specification forming part of Letters Patent No. 194,497, dated August 21, 1877; Reissue No. 8,667, dated April 8, 1879; application filed February 17, 1879.

*To all whom it may concern:*

Be it known that we, WM. O. HICKOK and ALBERT COOPER, of Harrisburg, in the county of Dauphin and State of Pennsylvania, have invented certain new and useful Improvements in Paper-Ruling Machines; and we do hereby declare that the following is a full, clear, and exact description thereof, reference being had to the accompanying drawings, and to the letters of reference marked thereon, which form a part of this specification.

The nature of our invention consists in certain improvements upon paper-ruling machines, as will be hereinafter more fully set forth, and pointed out by the claims.

In order to enable others skilled in the art to which our invention appertains to make and use the same, we will now proceed to describe its construction and operation, referring to the annexed drawings, in which—

Figure 1 is a side elevation of a part of a ruling-machine, showing the gearing. Fig. 2 is a side elevation of the same from the opposite side. Fig. 3 is a plan view, and Fig. 4 a transverse section, of the pen-clamp. Fig. 5 is a side view of one of the cams for operating the gate. Fig. 6 is a detailed perspective view of the device for operating the pen-clamp. Fig. 7 is a longitudinal section of the pen-cylinder.

A represents the frame of the ruling-machine. B B are the rollers over which the endless apron C passes. D is the pen-cylinder; E, the feed-roller; and G, the pen-beam, in which latter the pen-clamp H is held. The pen-beam G is provided with journals *a a*, which have their bearings in standards I I, secured on the frame.

In a full-sized machine we propose to have the journals *a* placed in boxes in the standards, and the said boxes adjustable therein by means of set-screws, so as to adjust the pen-beam up and down, as may be required.

Under one end of the pen-beam G is hinged the striker or striking-bar J, adjusted by means of set-screws *b b*, and operated by means of cams on one of the heads attached to the pen-cylinder shaft at or near the ends of said cylinder. The striker is provided with an adjusting-screw, L, which we make adjustable at different angles, so that it may be made to strike flat on its rest as the screw is run up or down. This we accomplish by means of a sleeve, K, having interior screw-threads, and provided on the side with a projecting shaft, *d*, which is passed through the striker J, and held by a nut, *e*, on the end of said shaft, by which means the sleeve K may be adjusted and held at any angle required to bring the end of the adjusting-screw L flat down on the rest. This adjusting-screw L is screwed down through the sleeve K, and held at any point therein by a jam-nut, L′, on the same.

M is the rest on which the end of the screw L strikes, said rest being adjustably secured to the frame A, and provided with a pad, *f*, for the screw L to strike on, to prevent noise, jarring, or any injury to the pens.

The pen-cylinder D is placed loosely on its shaft *h*, and rotated by the friction of the endless apron C. At or near the ends of this cylinder, on the shaft, are secured heads $D^1$ $D^2$. The head $D^1$ is provided with adjustable and removable cams *i i* for operating the striker J, and the head $D^2$ is provided with adjustable cams *k* for operating the gate of the ruling-machine. Each cam *k′* is provided with a T-shaped slot, *n*, to be passed over and adjusted on a set-screw, *m*, whereby said cam may be quickly secured to the head, and also easily regulated or adjusted to any desired and required position to regulate the trip of the gate.

The power to run the machine is applied to one end of the feed-roller E, and on the other end thereof is a cog-wheel, N, which meshes with a similar cog-wheel, $N^1$, on the journal of the apron-roller B, and this, through an intermediate idle cog-wheel, $N^2$, communicates motion to a cog-wheel, $N^3$, secured on the end of the shaft *h*, whereby the heads $D^1$ $D^2$ are rotated.

The idle cog-wheel $N^2$ is mounted on a stud, which is adjustable in a slotted arm, O, depending from the frame, so that the wheel $N^3$, on the end of the shaft *h*, may be exchanged for another of larger or smaller diameter, and the wheel $N^2$ adjusted to form the connection.

The cylinder runs at the speed imparted to it by the apron which carries the paper; but the heads, or rather the speed of the heads, is regulated to suit the size of the paper and the character of the ruling by the substitution of gear-wheels upon the shaft *h*. By this substitution the heads $D^1$ $D^2$ may be made to run at the same speed as the cylinder, or they may be made to run faster or slower than said cylinder, and we are thus enabled to employ a single cylinder for all kinds of ruling.

The work of replacing or substituting a gear-wheel to suit the work to be done is only that of a moment, and the expense of furnishing a series of graduated gear-wheels is very little.

The pen-clamp H is constructed in the usual form of two pieces, connected together by bolts and thumb-nuts for bringing the two pieces or jaws together. Through each jaw are passed metal pins or rivets *p*, which run in the line of the pens in close proximity to the clamps which operate the jaws, one pin being inserted on each side of the screw. Rivets or pins *t* are also passed into the tongue P on the pen-clamp, which enters the groove in the beam. These pins serve to greatly strengthen the pen-clamp, while they add very little to its weight.

The insides of the jaws of the pen-clamp are lined with thin strips of rubber *s*, either secured directly to the wood or to thin metal strips.

We may use rubber upon only one of the jaws, and either a thin narrow strip or broad thin strip, R, of metal upon the other, or partly both. By the use of the rubber the pens are clamped firmly, and are partially embedded in the rubber, thus closing, in a measure, the spaces between the pens, and thereby preventing the ink from running, and also forming a regulator with regard to the thickness of the pens. The beam G is also provided with brass pins for strengthening the same.

In place of the revolving pen-cylinder D a stationary board may be used, having an upper convex surface, over which the endless apron will pass.

By loosening the stud on which the wheel $N^2$ is mounted in the arm O, said wheel drops down and disengages from the wheels $N^1$ and $N^3$.

Having thus fully described our invention, what we claim as new, and desire to secure by Letters Patent, is—

1. In a paper-ruling machine, the combination of the pen-cylinder, rotating independently of its shaft, the shaft passing loosely through the cylinder, and a mechanism, substantially as described, secured to the shaft for operating the pen-bar.

2. In a paper-ruling machine, the combination of the pen-cylinder, rotating independently of its shaft, the shaft passing through the cylinder, and mechanisms, substantially as described, secured to the shaft, for operating the pen-bar and gate.

3. In a paper-ruling machine, the combination, with the striker, of a regulating-screw and a nut or screw-sleeve adjustable at varying angles, and through which the screw passes, for the purposes herein set forth.

4. In a ruling-machine, the pen-cylinder moving loosely upon its shaft by the friction of the apron, and the heads secured on the cylinder-shaft, and operated by a system of variable gearing, substantially for the purposes herein set forth.

5. In combination with the striker J, the screw-sleeve K, provided with the shaft *d*, passing through the striker and held by a nut, *e*, at any angle desired, and the adjusting-screw L, passed through the sleeve, whereby the sleeve and screw may be adjusted at any angle desired, for the purposes herein set forth.

6. The adjustable rest M, provided with the pad *f*, in combination with the adjustable screw L, for the purposes set forth.

7. In combination with the head $D^2$ at the end of the pen-cylinder of a ruling-machine, the cam *k*, provided with the T-shaped slot *n*, and adjusted and held to the head $D^2$ by set-screw *m*, as and for the purposes herein set forth.

8. In a pen-clamp for ruling-machines, one or both of the jaws provided with a strip, *s*, of rubber or equivalent material extending the entire length thereof, for the purposes herein set forth.

In testimony that we claim the foregoing we have hereunto set our hands this 11th day of February, 1879.

W. O. HICKOK.
ALBERT COOPER.

Witnesses:
S. SCHRIVER,
W. O. HICKOK, Jr.